US010536278B1

(12) United States Patent
Donaldson et al.

(10) Patent No.: US 10,536,278 B1
(45) Date of Patent: Jan. 14, 2020

(54) SIGNED CALL RECORDING

(71) Applicant: Securus Technologies, Inc., Dallas, TX (US)

(72) Inventors: Gordon Donaldson, Allen, TX (US); Krishna Balantrapu, Irving, TX (US)

(73) Assignee: Securus Technologies, Inc., Carrollton, TX (US)

( * ) Notice: Subject to any disclaimer, the term of this patent is extended or adjusted under 35 U.S.C. 154(b) by 254 days.

(21) Appl. No.: 15/472,885

(22) Filed: Mar. 29, 2017

Related U.S. Application Data

(60) Provisional application No. 62/350,072, filed on Jun. 14, 2016.

(51) Int. Cl.
| | |
|---|---|
| *H04L 9/32* | (2006.01) |
| *H04L 9/06* | (2006.01) |
| *G11B 20/10* | (2006.01) |
| *H04M 3/42* | (2006.01) |
| *H04M 3/22* | (2006.01) |

(52) U.S. Cl.
CPC ...... *H04L 9/3247* (2013.01); *G11B 20/10527* (2013.01); *H04L 9/0643* (2013.01); *H04L 9/3231* (2013.01); *H04M 3/2218* (2013.01); *H04M 3/2281* (2013.01); *H04M 3/42221* (2013.01); *H04M 2203/303* (2013.01)

(58) Field of Classification Search
None
See application file for complete search history.

(56) References Cited

U.S. PATENT DOCUMENTS

| | | | | |
|---|---|---|---|---|
| 6,785,815 | B1* | 8/2004 | Serret-Avila | .......... G06T 1/0071 348/E7.06 |
| 8,098,804 | B1* | 1/2012 | Rae | .......... H04M 3/38 379/142.05 |
| 8,121,264 | B1* | 2/2012 | Hogg, Jr. | .......... H04M 3/42221 370/260 |
| 9,020,114 | B2* | 4/2015 | Hogg, Jr. | .......... H04M 3/2281 379/188 |
| 9,300,790 | B2* | 3/2016 | Gainsboro | .......... H04M 3/2281 |
| 2006/0242417 | A1* | 10/2006 | Paya | .......... G06F 21/64 713/176 |
| 2007/0036283 | A1* | 2/2007 | Shaffer | .......... H04M 3/42221 379/67.1 |

(Continued)

*Primary Examiner* — Kambiz Zand
*Assistant Examiner* — Arezoo Sherkat
(74) *Attorney, Agent, or Firm* — Fogarty LLP

(57) ABSTRACT

Systems and methods provide the generation of signed recordings of audio and video calls. The signed recordings include information that may be used to verify the integrity of a purported copy of the recording. The recording may be generated by capturing the audio and/or video from a monitored communication and streaming the captured data to a recording. As the captured data is streamed to the media file used for the recording, a hash value is calculated for each segment of the received data. Information describing the context of the communication may be used to generate another hash value. A digital signature for the recorded call may be generated based on the two combined hash values. Operating in this manner, a signed recording of the communication may be generated while a recording of the communication to a media file is being made, rather than by post-call processing of a stored file.

16 Claims, 3 Drawing Sheets

(56) References Cited

U.S. PATENT DOCUMENTS

| | | | |
|---|---|---|---|
| 2007/0274293 A1* | 11/2007 | Forbes | H04L 63/08 370/352 |
| 2008/0118042 A1* | 5/2008 | Hogg | H04M 3/2281 379/93.03 |
| 2009/0123136 A1* | 5/2009 | Bernsley | G11B 27/105 386/239 |
| 2011/0286584 A1* | 11/2011 | Angel | H04M 3/42221 379/88.02 |
| 2011/0287748 A1* | 11/2011 | Angel | H04M 3/42221 455/414.1 |
| 2016/0048696 A1* | 2/2016 | Follis | G06F 21/6209 726/28 |

* cited by examiner

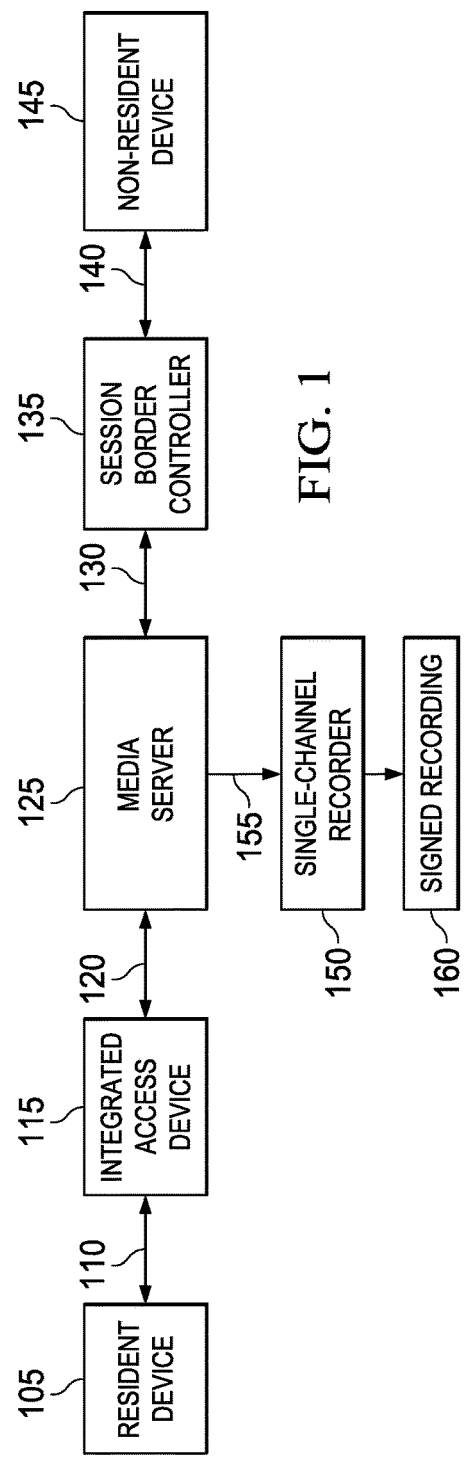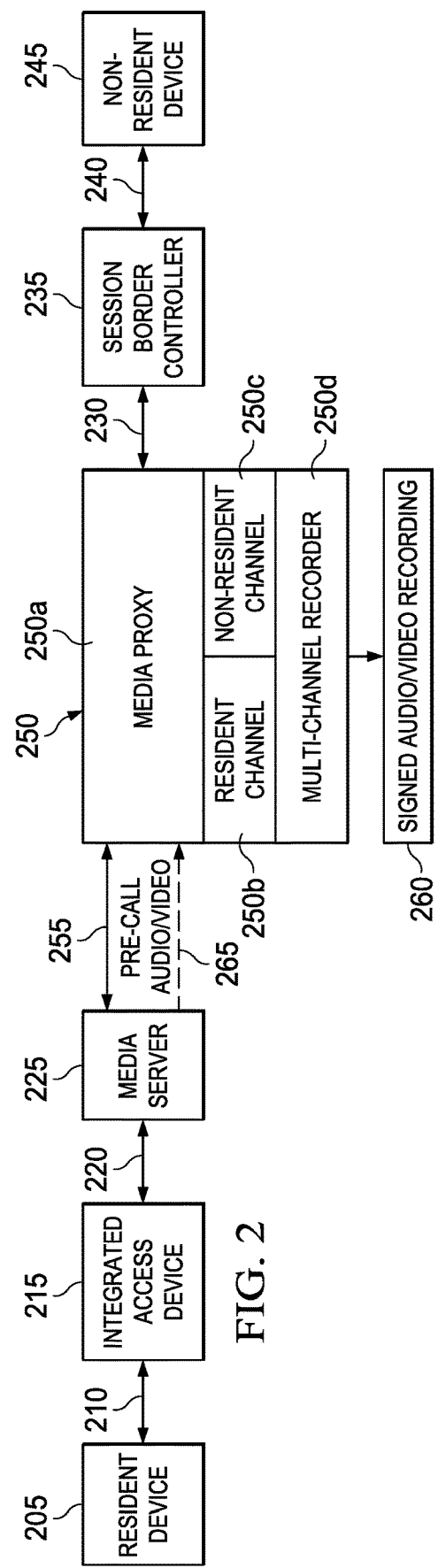

SIGNED CALL RECORDING

CROSS REFERENCE TO RELATED APPLICATIONS

This patent application claims priority to provisional U.S. Patent Application No. 62/350,072 filed on Jun. 14, 2016 and titled "Validated Call Recording" which is herein incorporated by reference.

TECHNICAL FIELD

The following description relates generally to voice data recordings, and more particularly to authenticating signed voice data recordings.

BACKGROUND OF THE INVENTION

Correctional facilities utilize communication systems that allow facility residents the ability to make voice and video calls, where these calls are subject to various conditions. These communication systems also provide the ability for administrators of the correctional facility to record the voice and video calls made by residents. These recordings of voice and video calls may be made according to a variety of rules that allow options such as recording calls made to specific telephone numbers, recording calls made by certain residents, recording calls made using specific devices, or recording calls that are processed by the communication system.

Recordings of resident voice and video calls may be monitored by authorities in order to determine information of interest, including information regarding continuing, past or planned criminal activities. The communication system may provide a variety of tools for detecting prohibited behavior, such as the participation of unauthorized individuals in a resident's call. These voice and video call recordings may also be stored for later investigation. In some situations, a recording may be deemed of evidentiary importance. For instance, a prosecutor may determine that a recorded call of an inmate may be used as evidence of criminal activity. In order to facilitate the use of recorded voice and video calls in this manner, it is desirable for the generated recordings to be admissible as evidence in a court of law.

When being used as evidence in a court of law, it is preferred that the authenticity of recorded calls can be established within requirements for admissibility of evidence. For tangible evidence (e.g., a weapon, an item of clothing, collected body fluids), accepted practices exist for establishing the authenticity and preserving a "chain of custody" of the evidence such that evidentiary requirements for admissibility can be proven according to the applicable laws and regulations. In general, each step of handling and storing an item of tangible evidence, from the point of collection of the evidence up to the proffer of the evidence in a courtroom, must be attested to by a witness. In a criminal matter, an authenticating witness is typically a police officer, a detective, a crime scene investigator, or a laboratory technician. When an item of tangible evidence in a criminal matter is not being actively used, it is typically placed in a sealed physical container and stored to an evidence storage facility (e.g., evidence locker). The physical container is typically identified, dated, and secured in a fashion that is intended to show that no tampering of the evidence took place during its storage. Various measures may be implemented for controlling and documenting access to stored evidence.

As with traditional tangible evidence, the issue of authentication must be addressed when proffering audio and video recordings of calls as evidence in a court setting. However, establishing the authenticity of a voice or video call recording presents certain difficulties that are not present when establishing the authenticity of tangible evidence. One such difficulty is establishing that the recording is an authentic reproduction of the monitored call and that the original recording has not been altered. Audio data, especially digital audio files, can be modified in ways that may be very difficult to detect. For example, recordings are typically stored to a file having a standard audio file format, such as a WAV or an AU audio file format. A variety of tools are freely available for editing such well-known file formats, providing an increased risk of an audio recording using one of these formats being edited in some way. The ability to record video has proliferated with the spread of portable devices capable of recording video has resulted in a similar spread of common filed formats and widely available tools capable of sophisticated video editing. The problematic nature of such file formats is increased further by legal requirements obligating criminal prosecutors to share important evidence with defendants in criminal proceedings. With multiple versions of the same recording at large, establishing whether an audio or video recording is an unaltered copy of the original call becomes increasingly important.

Another shortcoming of certain audio and video file formats is the lack of a capability, provided within the file itself, to establish the authenticity of the recorded information (i.e., to establish that the original recorded audio and/or video data has not been altered). Certain file formats provide the ability to specify additional information about the audio and/or video data in an associated "header." A header may be used to provide additional information regarding the contents of the file. However, nothing prevents the editing of the header information and no capability is provided for establishing that the header information has not been modified.

These evidentiary requirements are not unique to scenarios where voice or video call recording made by correctional facilities are generated for use in a criminal setting. The need to authenticate an audio or video recording may arise in a variety of contexts. For instance, establishing the authenticity of a recording of a financial or legal transaction that is conducted at least in part via telephone or videoconference.

BRIEF SUMMARY

Various embodiments provide systems and methods for the generation of signed recordings of audio and video calls. In particular, signed call recordings are generated where the recordings include information that may be used to verify the integrity of a purported copy of the recording. The recording may be generated according to various embodiments by capturing the audio and/or video from a monitored communication and streaming the captured data to a recording. As the captured data is streamed to the media file used for the recording, a one way hash function may be used to continually calculate a running hash value of the streaming data as it is received. In addition, in certain embodiments, information describing the context of the communication may also be used to generate another hash value. A digital signature may then be generated based on the two combined hash values.

Operating in this manner, a signed recording of the communication may be generated while a recording of the communication to a media file is being made, rather than by post-call processing of a stored file. An encrypted digital signature may be included in the media file such that the integrity of a purported copy of the media file can be verified by comparing a hash value calculated based on the purported copy against the signed hash included within the digital signature. This allows the integrity of a purported copy of the recording to be determined and thus significantly reduces the possibility of tampering.

Various embodiments, provide methods systems and computer-readable storage devices having program instructions for generating a signed recording of a communication, the embodiments including: receiving a plurality of data segments that comprise the communication between a resident of a controlled-environment facility and a non-resident of the facility; computing a segment hash for each of the plurality of data segments; updating a communication data hash based on each generated segment hash; saving the plurality of data segments in a first track of a multi-track media file; generating call context information describing the communication; computing a call context hash based on the call context information; generating a digital signature, upon termination of the communication, wherein the digital signature comprises a combination of the communication data hash and the call context information; and saving the digital signature to a second track of the multi-track media file.

In various additional embodiments, the segment hashes are generated using a cryptographic hash function. Various additional embodiments further include saving the call context information to a third track of the multi-track media file. In various additional embodiments, the communication data hash and the call context hash are combined using an XOR logical operation. In various additional embodiments, the communication data segments further comprise a data stream including a plurality of channels of media data. In various additional embodiments, a first channel of the plurality of channels of media data is received from a voice call device used by the resident of the controlled-environment facility and wherein a second channel of the plurality of channels of media data is received from a voice call device used by the non-resident. In various additional embodiments, the call context information includes one or more of: the point of origin for the communication, the point of termination of the voice call, the identity of the non-resident, the identity of the resident, biometric information identifying the resident, the date of the communication, the time of the communication, the duration of the communication, and security protocols applicable to the communication. In various additional embodiments, the digital signature is further generated by encrypting the combined hash using a private key.

Various additional embodiments provide methods, systems, and computer-readable storage devices having program instructions for verifying a signed recording of a communication, the embodiments including: receiving a multi-track media file storing the signed recording of a communication between a resident of a controlled-environment facility and a non-resident of the facility; computing a first hash based on data stored in a first track of the multi-track media file; decrypting a digital signature stored in a second track of the multi-track media file; extracting a communication data hash from the decrypted digital signature; comparing the computed first hash versus the extracted communication data hash; and signaling that the multi-track media file includes a signed recording of the communication, if the computed first hash and the extracted communication data hash are equivalent.

Various additional embodiments may further include: computing a second hash based on call context information stored in a third track of the multi-track media file; extracting a call context hash from the decrypted digital signature; comparing the computed second hash versus the extracted call context hash; and signaling that the multi-track media file includes a signed copy of the call context information for the communication, if the computed second hash and the extracted call context hash are equivalent. In various additional embodiments, the first hash is computed using the same hash function used to generate the extracted communication data hash. Various additional embodiments may further include: retrieving an archived communication data hash computed during the generation of the signed recording of the communication; comparing the computed first hash versus the archived communication data hash; and signaling that the multi-track media file includes a signed recording of the communication, if the computed first hash and the archived communication data hash are equivalent.

BRIEF DESCRIPTION OF THE DRAWINGS

Having thus described the invention in general terms, reference will now be made to the accompanying drawings, which are not necessarily drawn to scale, and wherein:

FIG. 1 is a block diagram of a system according to various embodiments for generating a signed recording of a communication.

FIG. 2 is a block diagram of a system according to various additional embodiments for generating a signed recording of a communication.

Figure 3:
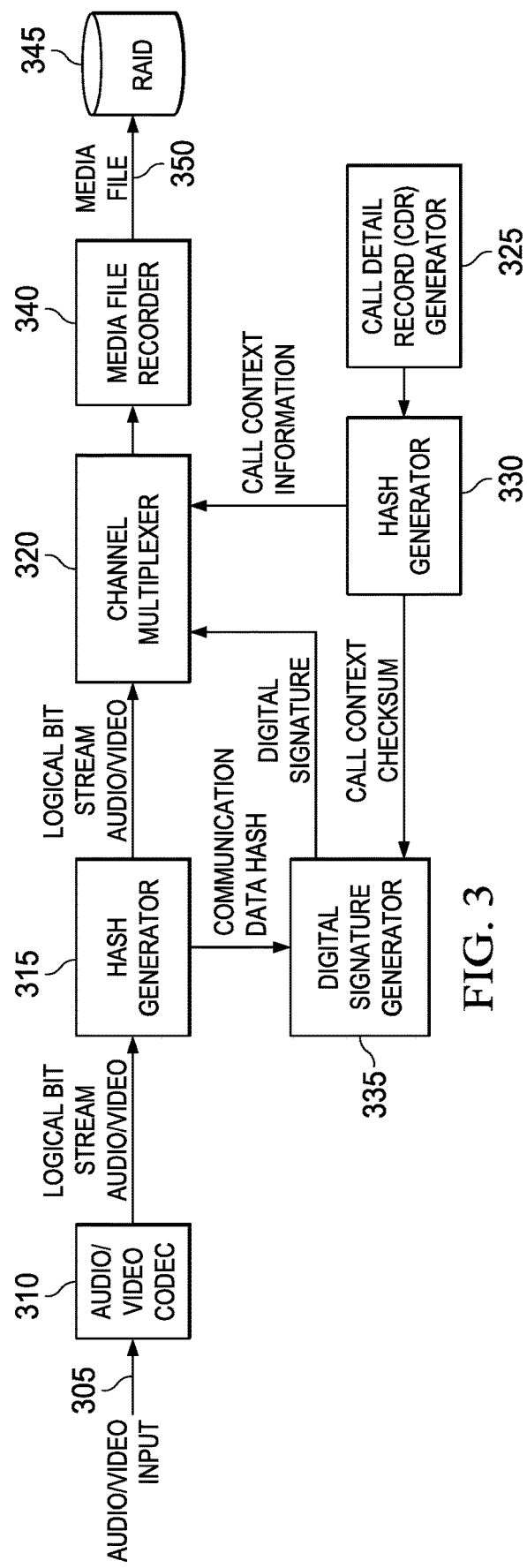

FIG. 3 is a block diagram of a system according to various embodiments for generating a hash value that may be used to authenticate a signed recording of a communication.

Figure 4:
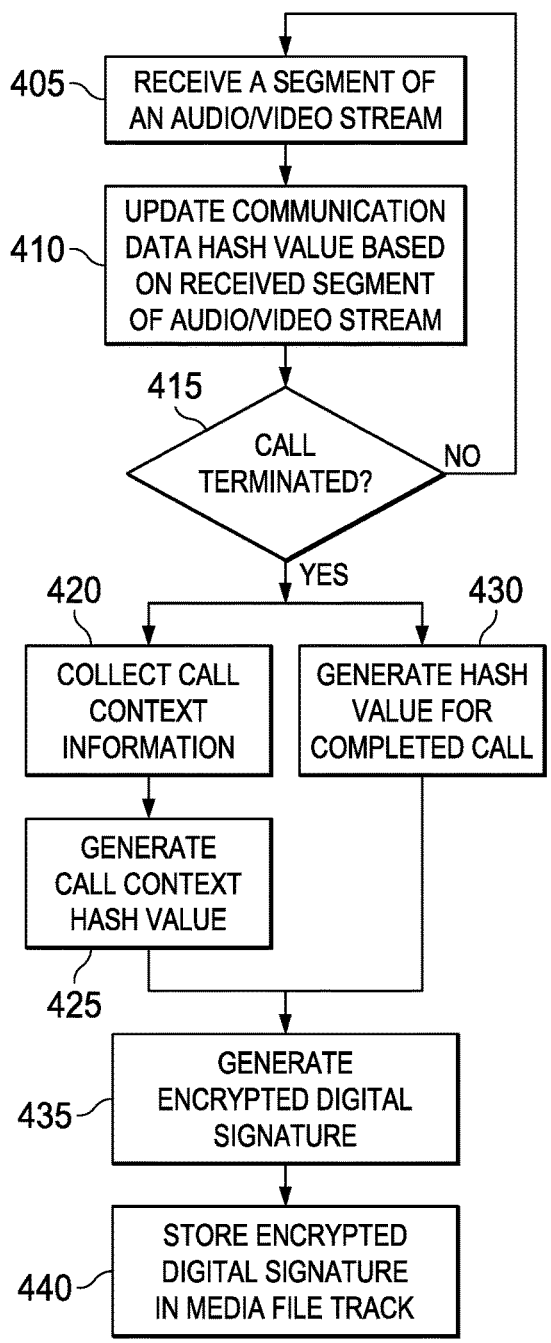

FIG. 4 is a block diagram illustrating certain steps of process according to various embodiments for generating a signed recording of a communication.

Figure 5:
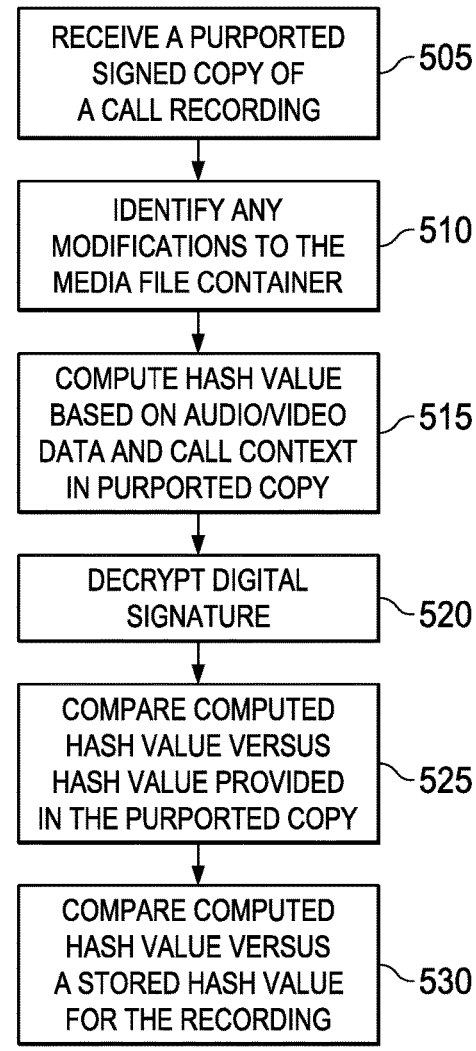

FIG. 5 is a block diagram illustrating certain steps of process according to various embodiments for verifying the integrity of a purported copy of a signed recording of a communication.

DETAILED DESCRIPTION

The invention now will be described more fully hereinafter with reference to the accompanying drawings. This invention may, however, be embodied in many different forms and should not be construed as limited to the embodiments set forth herein. Rather, these embodiments are provided so that this disclosure will be thorough and complete, and will fully convey the scope of the invention to those skilled in the art. One skilled in the art may be able to use the various embodiments of the invention.

FIG. 1 is a diagram of a system according to various embodiments for generating a signed recording of a communication, such as a voice call or other communication suitable for recording as a single channel of media. In the illustrated embodiment, a media server 125 and a single-channel recorder 150 are used to generate a signed recording 160 of a voice call made or received by a resident of a controlled-environment facility. Various systems utilized by the controlled-environment facility may interoperate to provide residents with communication services, in particular the ability to make calls. These systems may be segmented into nodes that are dedicated to providing communication services, such as voice and video calls, to a subset of the supported controlled-environment facilities. These systems may also interoperate to implement various security protocols that place restrictions on voice and video calls. These restrictions generally prohibit a resident from directly dialing any line that is not under the control of the controlled-environment facility. As such, any call by a resident must first be authorized via any one of various automated and manual mechanisms for enforcing applicable security policies. Accordingly, media server 125 may interoperate with various other systems that are used to provide communication services to residents of a controlled-environment facility.

In the embodiment of FIG. 1, a request for a voice call is issued by a resident of the controlled-environment facility via resident device 105. In one embodiment, resident device 105 may be a secured telephone handset device provided at certain locations within the controlled-environment facility. In another embodiment, the resident device 105 may be a personal communication device issued to the resident on a temporary or permanent basis. In various additional embodiments, the resident device 105 may be any communication device that allows the resident to place an authorized call via the communication system provided by the controlled-environment facility.

In a typical scenario, a resident uses resident device 105 to seek authorization to establish a voice call to a non-resident of the controlled-environment facility. In another scenario, a request for a call with a particular resident is received by the communication system from a non-resident that is using non-resident device 145. In various different scenarios, non-resident device 145 may be a mobile cellular telephone, an internet-protocol voice call software program running on a computer that is operated by the non-resident, a pay phone, or a POTS landline. As with the resident device 105, in various additional embodiments, the non-resident device 145 may be any communication device that allows the non-resident to participate in a voice call with the resident via the communication system provided by the controlled-environment facility.

The communication system authorizes and monitors calls between resident device 105 and non-resident device 145 based on the applicable security policies. The communication system enforces some of these security policies at the time the request for a call is received and only forwards the request to the called party if the applicable security policies indicate that the requested voice call is permitted. For instance, if a request is received from the resident device 105 for a voice call with a non-resident that is using non-resident device 145, the communication system first determines whether the resident is currently allowed any communications and then also determines whether the resident is allowed to communicate with the non-resident. If the call is determined to be authorized, the communication system forwards the call request to the non-resident device 145. The individual that answers the call on the non-resident device may be further identified by the communication system in order to determine whether the resident is authorized to speak to the individual that answered the non-resident device 145. If the non-resident is authorized and consents to participating, the call is allowed to proceed. Different security policies may be enforced with respect to voice call requests versus video call requests made by a resident.

This process for connecting a call is facilitated by media server 125. When a call request is received, a conferencing application hosted by media server 125 is used to open a conference call bridge and route the pending call request to the conference bridge. While the pending request waits in conference, the communication system may determine if the requested call is authorized and, if so, forwards the call request to the non-resident device 145. If the individual answers and accepts the call request and is determined to be authorized to speak to the resident making the request, the individual answering the non-resident device 145 is routed to the waiting conference bridge hosted by the media server 125. The conference bridge application hosted by media server 125 enables the resident and the non-resident to communicate, while at the same time allowing messages to be injected into the conference. Such messages may be used to alert the parties to the call regarding prohibited activities or call duration limits that are being enforced.

In the illustrated embodiment, the media server 125 also interoperates with the single-channel recorder 150 to generate a signed recording 160 of the call conducted between the resident device 105 and the non-resident device 145. The signed recording 160 generated by the single-channel recorder 150 also includes any messages interjected into the voice call by the media server 125. This includes automated and human messages interjected into the ongoing call and may also include messages generated by the communication system that are used to relay the call request to the called party. The messages may also include any standard announcements that notify the parties that the call is subject to monitoring and is being recorded. The signed recording 160 of the call generated by the single-channel recorder 150 thus includes all audio heard on a voice call.

The output of single-channel recorder 150 is a signed recording 160 of the monitored call. In scenarios where the monitored call is a voice call, the signed recording 160 includes a single channel of audio data consisting of all of the audio from the monitored voice call. The audio recorded in the single channel includes audio 110 captured by the microphone(s) of the resident device 105. The audio 110 from the resident device 105 is received by an integrated access device 115 that is configured to provide voice calling services to multiple resident devices that are supported by the controlled-environment facility's communication system. In addition to supporting voice calls, the integrated access device 115 may also be used to provide residents with additional communication services, such as video calls. In certain embodiments, the integrated access device 115 compresses the audio data received from the resident device 105 and transmits the compressed audio 120 to the media server 125 via an access link. In certain of such embodiments, the integrated audio device 115 may utilize a compression algorithm, such as G.729, to generate the compressed audio 120.

In a similar manner, the media server 125 receives compressed audio 130 that originates from the non-resident device 145. This audio from the non-resident device is also included in the single channel of audio generated by the single-channel recorder 150. As with the resident device 105, audio captured by the microphone(s) of the non-resident device 145 and the captured audio 140 is forwarded to a session border controller 135. In certain embodiments, the session border controller 135 is a component utilized by the communication service provider that is being used by the non-resident device 145. The session border controller 135 manages communication sessions, including voice calls, on behalf of the non-resident device 145. In certain embodiments, the session border controller 135 compresses the captured audio 140 that is received from the non-resident device 145 and transmits the compressed audio 130 to the media server 125. In certain of such embodiments, the session border controller may utilize a compression algorithm such as G.711, to generate the compressed audio 130. Other embodiments may utilize additional or separate components in supporting voice calls with the non-resident device 145.

The media server 125 receives the compressed audio stream 120 originating from the resident device 105 and the compressed audio stream 140 originating from the non-resident device 145 and mixes these two streams into a single channel audio stream 155. The media server 125 also mixes into the single channel audio stream 155 any audible information that is interjected into the voice call via the communication system. As described above, this interjected audio may include pre-recorded messages by a human speaker and/or computer-generated messages that may be dynamically created based on situational parameters. The interjected audio may also include live audio spoken by a human call control official joining the conference call to provide information to the participants. The mixed stream of single channel audio data 155 is then pushed to the single-channel recorder 150. In this manner, the media server 125 captures and provides the audio data necessary for generating a complete record of the voice call between the resident and the non-resident, where the recording can be used to reproduce the voice call as it was heard by its participants.

In certain embodiments, the voice call recording is initiated by the media server 125 immediately upon receipt of a voice call request from the resident device 105. In such embodiments, the single channel audio stream 155 generated by the media server includes all audio from the resident device 105 starting from the time the call request is received by the media server 125. As such, the recorded audio from the resident device 105 includes the interactions between the resident and the communication system in requesting and setting up the voice call to the non-resident device 145. The recorded audio would also include any system announcements provided to the resident and/or to the party answering the call on the non-resident device 145. Such announcements may provide the called party with information describing the call request such as the identity of the resident issuing call request, the name of the correctional facility where the resident is issuing the request from, and applicable calling rates. The announcements included in the recording may also include broadcast information such as confirmation of call acceptance and any notification messages announcing that the call is subject to monitoring and is being recorded.

In certain additional embodiments, the voice call recording begins as soon as the resident initiates the request for a voice call using the resident device 105. In some scenarios, the resident may be prompted to provide identifying information, such as an assigned PIN or a biometric identifier, where this identifying information is used to authenticate the resident. If the resident is authenticated, a voice call request may be issued by the resident. In certain scenarios, before issuing a request for a voice call to the media server 125, the request is first configured by prompting the resident to speak the name of the non-resident that the resident is seeking to call. The resident may also be prompted to provide additional information.

In embodiments where the resident device 105 is a secured telephone handset provided by the controlled-environment facility, recording may thus begin as soon as the resident lifts the provided handset from its hook. In such embodiments, these interactions by the resident in configuring the voice call request are captured and included in the single channel audio stream 155 that is provided by the media server 125 for recording by the single-channel recorder 150. In other embodiments, the resident device 105 is a personal device that is controlled by a resident on either a temporary or permanent basis. In such embodiments, audio recording may be initiated as soon as the resident opens the software program or module that is used for issuing a voice call request.

Based on the single channel audio stream 155 provided by the media server 125, the single-channel recorder 150 generates a signed recording 160 of the voice call. As described, the audio provided by the media server 125 combines audible system messages with the audio captured by the devices used by the parties to the monitored voice call. This output of the media server 125 thus provides a complete and accurate reproduction of the voice call, this reproduction being suitable for use as an exhibit in a legal proceeding. However, as with physical evidence, the chain of custody of the recording must be established in court in order for a recorded voice call to be accepted as authenticated evidence. As described above, the ability to edit audio files and the necessity of making copies of the recording in order to comply with evidence sharing requirements results in a substantial risk of tampering with recorded voice calls. Consequently, embodiments provide a capability for ensuring that a recorded voice call has not been edited.

As described in further detail with respect to FIG. 3, the single-channel recorder 150 generates a signed recording 160 of the monitored voice call, where the recording includes information that can be used to verify the integrity of the recording. Accordingly, in addition to the monitored audio, the signed recording also includes a digital signature that can be used to verify that the complete, unedited reproduction of the voice call audio data is present in the recording. As described with respect to FIG. 3, in certain embodiments, the single-channel recorder 150 may use a cryptographic hash function to generate a hash value of the received single channel audio stream 155. The hash function generates a hash value that corresponds uniquely to the audio present in the single channel audio stream 155 and includes a copy of the hash value in the audio file. The provided hash value may then be used to detect any modifications to the audio data in a purported copy of the recording. Such modifications to the recording may be detected by using the same hash function that was used to generate the signed recording to compute the hash value of the audio data included in the purported copy of the recorded voice call. In this manner, the single-channel recorder 150 generates a signed recording 160 of a voice call, where the recording itself includes information that can be used to verify the integrity of the recording.

FIG. 2 is a diagram of another system according to various additional embodiments for generating a signed recording of a communication such as a voice call or a video call. Like the system of FIG. 1, the system in FIG. 2 may also be used to generate a signed recording of a voice call between a resident of the controlled-environment facility using resident device 205 and a non-resident using non-resident device 245. In addition, the embodiment of FIG. 2 may also be used to generate a signed recording of a video call between the resident and non-resident, each using these same devices 205, 245. In the same manner as the embodiment of FIG. 1, the communication data 210 captured at the resident device 205 is received by an integrated access device 215 that delivers the compressed resident communication data 220 to the media server 225. Similarly, the communication data 240 from the non-resident device 245 is received by a session border controller 235 that generates compressed non-resident communication data 230. However, unlike the system of FIG. 1, the compressed non-resident communication data 230 is intercepted by a real time media relay 250 prior to being provided to the media server 225.

Whereas the system of FIG. 1 records a single-channel audio stream provided by the media server, the system of FIG. 2 generates a signed recording 260 that includes multiple tracks of audio and/or video, with the different tracks each representing different sources of audio and/or video that make up the recorded call. In certain embodiments, the multi-track recording 260 may be generated by a multi-channel recorder 250d, which is a component of the real-time media relay 250. Rather than utilize a single-channel of audio that is mixed from the different audio streams received by the media server, as in the embodiment of FIG. 1, a multi-channel recording 260 may be generated based on the real-time media relay 250 intercepting each of the communication data streams that are being used to conduct the monitored call, in which each captured communication data stream represents one or more of the channels of audio and/or video data that are included in the multi-channel recording 260.

The real-time media relay 250 intercepts incoming call data sent from the session border controller 235 on behalf of the non-resident device 245. In particular, the real-time media relay 250 may intercept incoming call data 230 transmitted by session border controller 235 and intended for the media server 225. In certain embodiments, the real-time media relay 250 may be configured to intercept all incoming call data 230 intended for the media server 225. In certain embodiments, the real-time media relay 250 may instead be configured to only intercept call data 230 for certain calls that are being recorded. The real-time media relay 250 may also be configured to intercept outgoing call data 255 being sent by the media server 225 to the non-resident device 245 via the session border controller 235. This outgoing call data 255 includes the call data from the resident device 205 and may also include any audible system messages that are being interjected into the voice call, and in the case of a video call any visual messages or information that is displayed for the resident and/or the non-resident on their respective devices.

One function of the real-time media relay 250 may include serving as a relay between the media server 225 and the session border controller 235 in a manner that facilitates the transfer of call data between the resident device 205 and the non-resident device 245. In addition to intercepting the call data between the media server 225 and the session border controller 235, the real-time media relay 250 may utilize a component such as media proxy 250a to also forward all intercepted call data on to its destination. The media proxy 250a may be configured to intercept certain call packets transmitted between the media server 225 and the session border controller 235 by making a copy of intercepted call packets and further configured to transmit the original call packets 255 and 230 to their intended destination—either the media server 225 or the session border controller 235. Configured in this manner, the real-time media relay 250 enables a multi-track recording of the call to be captured while the monitored call is being conducted and without disrupting the monitored call.

In the illustrated embodiment, the real-time media relay 250 receives one channel of communication data from the intercepted call data originating from the non-resident device 245. The real-time media relay 250 receives one or more channels of audio and/or video from the media server 225. In certain embodiments, one channel of communication data received from the media server 225 is comprised of audio and/or video data being transmitted from the resident device 210 and additional channels may be used to provide system messages from various sources, such as human call control officials joining the call and automated system messages and visual messages displayed during video calls. In certain embodiments, the real-time media relay 250 may also receive additional channels of audio and/or video call data from additional participants. For instance, in some scenarios, two or more non-residents operating different devices may participate in a conference call with the resident. In such scenarios, the voice call data from each of the participants is intercepted by the real-time media relay 250, with the voice data from each participant being treated as a different channel of audio. In a similar manner, multiple participants may be included in a videoconference, with the video feed captured by each participant being treated as a different channel of video data. In certain embodiments, certain participants to a call may participate via video while others may participate strictly via audio. In such scenarios, certain channels may contain strictly audio from a participant, other channels may contain strictly video and/or channels may include both audio and video combined.

As voice and/or video call data from each participant is captured by the real-time media relay 250, the captured packets are copied and stored to a shared memory 250b-c of the real-time media relay. The call data from each participant may be treated as a separate channel and separately stored in designated portion of the shared memory 250b-c. In the illustrated embodiment, the communication data from the resident device 210 is received and stored to one portion 250b of the shared memory and the audio from the non-resident device 245 is received and stored to a second portion 250c of the shared memory. In video call embodiments, the audio and video from a call participant may each be stored to separate portions of the shared memory. In certain embodiments, the shared memory 250b-c is used to buffer the audio and/or video streams received from each participant. As the received data is buffered in the shared memory 250b-c, synchronous segments of the audio and/or video data from each channel are accessed by the multi-channel recorder 250d.

As described in detail with respect to FIG. 3, the voice call recoding is progressively signed by updating a hash value for each synchronous segment of the received communication data retrieved by the multi-channel recorder 250d. Each retrieved synchronous segment of communication data is then saved to a media file being used to store the signed recording. As synchronous segments of the communication data are stored to the media file, memory from the shared memory 250b-c can be freed and used to continue the buffering of received call data. In this manner, the intercepted audio and/or video is streamed to an media file as the call is occurring, with the means for validating the recording being progressively generated as the communication data is received.

As with the single-channel audio stream generated with the embodiment of FIG. 1, the multi-channel communication data stream that is generated by the multi-channel recorder 250d accessing the buffered communication data for each intercepted channel is likewise used to generate a signed recording of the call. As described with respect to the embodiment of FIG. 3, information that can be used to verify the integrity of the recording is also included within the recording itself. In certain embodiments, the multi-channel recorder 250d may use a cryptographic hash function to generate a digital signature of the received multi-channel communication data stream. The hash function may be used to generate a hash value based on the received multi-channel communication data stream, with the hash value then being encrypted to generate a digital signature for the recorded call.

In certain embodiments, the multi-channel communication data stream utilized by the multi-channel recorder 250d may contain multiple distinct channels of audio data, but may nonetheless be encoded by the multi-channel recorder 250d as a single stream of data. In such embodiments, encoding formats may be selected that allow multiple channels of audio data to be encoded by providing one steam of audio that includes metadata indicating the strength of the audio signal received from each input source, such as the microphones of the resident device and the non-resident device. Configured in this manner, a single stream of audio data that encodes multiple channels of audio may be used to generate a single digital signature that can be used to validate the integrity of the audio from each of the channels of audio, while still allowing investigators the ability to process the audio from each channel independently.

In certain scenarios, the ability to independently process audio data from individual audio channels that comprise a voice call allow investigators the ability to detect certain prohibited behaviors, such as residents using a voice call to relay messages provided from unauthorized participants. By selectively analyzing the audio channels, investigators are able to determine whether the unauthorized participant is participating from the resident device 205 or the non-resident device 245.

As described above, in certain embodiments the signed call recording system may be configured to begin recording on the resident device 205 as soon as the resident initiates a call request. In embodiments where the resident device 205 is a telephone handset provided by a controlled-environment facility, recording may begin upon the resident lifting the handset from its hook, thus capturing the audio heard while the residents configures and issues a call request. In video call embodiments, recording of audio and/or video may begin as soon as the resident begins operation of the resident device such that the camera and/or microphone of the resident device is activated. In various embodiments, call recording is initiated prior to any call being established or even requested. Accordingly, at this point there is no call data to be intercepted by the real-time media relay 250, since no call has been configured between the media server 225 and the session border controller 235. In the embodiment of FIG. 1, the captured "pre-call" audio and/or video data is recorded by forwarding this captured communication data to a conference bridge that will be used to host any subsequent voice and/or video call. In the embodiment of FIG. 2, the media server 225 may be configured to facilitate recording of any "pre-call" audio and/or video data 265 by forwarding this captured data from the conference bridge to the real-time media relay 250.

FIG. 3 is a block diagram illustrating certain aspects of a system configured to generate a signed recording of a voice and/or video call that includes a digital signature that can be used to determine whether a purported copy of the call has been modified, and thus to determine whether the copy is a true reproduction of the call. The system of FIG. 3 may be implemented by one or more components of a communication system of a controlled-environment facility, for instance by a component such as the single-channel recorder 150 of FIG. 1 or the multi-channel recorder 250d of FIG. 2. Using the system of FIG. 3, an communication data input stream 305 is received and a signed recording 350 of the received communication data is generated and stored to a repository 345.

In scenarios where the system of FIG. 3 is implemented as a sub-system of a component such as the single-channel recorder 150 of FIG. 1, the received communication data stream 305 may be the single channel audio stream 155 generated by the media server 125. In scenarios where the system of FIG. 3 is implemented as a sub-system of a component such as the multi-channel recorder 250d of FIG. 2, the received communication data stream 305 may include each of the audio and/or video streams retrieved by the multi-channel recorder from the shared memory 250b-c being used to store each of the received channels of audio and/or video data. As described, in certain embodiments, the multi-channel recorder 250d may be configured to encode multiple channels of audio from the shared memory location a single stream of audio. In such embodiments, the received audio stream 305 is this single stream of audio that includes the multiple tracks of audio.

In certain embodiments, the received communication data stream 305 may be compressed using an audio and/or video codec 310. In certain embodiments, the Speex codec may be used as the audio codec 310 for compressing the received streaming audio 305. Other embodiments may use other codecs, such as Opus, SILK, or CELT, for compressing the received communication data stream 305. Certain embodiments may utilize additional audio processing, video processing and/or signal processing techniques, such as noise filtering, of the received communication data stream 305 prior to compression of the communication data using the audio/video codec 310.

As described with respect to the embodiment of FIG. 2, the multi-channel recorder 250d retrieves received communication data from shared memory 250b-c in order to record a monitored voice and/or video call to a media file. As communication data is written to the media file, that communication data is removed from shared memory. The resulting buffering of the communication data results in segments of the communication data being individually processed as they are intercepted from network traffic by which the ongoing voice and/or video call is being conducted. Accordingly, in certain embodiments, the received data stream 305 is comprised of a series of segments of audio and/or video data that are being buffered from a shared memory used to store the captured audio and/or video data. In such embodiments, the audio/video codec 310 receives and compresses these segments of audio and/or video data that comprise the received communication data stream 305.

The hash generator 315 may be used to generate a hash value for the segments of compressed audio and/or video generated by the audio/video codec 310. In certain embodiments, the hash generator 315 utilizes a hash function to compute a hash value for each segment of the audio and/or video data that is received. The hash generator 315 updates the hash value as successive segments of the audio and/or video data are received. In this manner, the value of the hash value maintained by the hash generator 315 always represents all audio and/or video segments that have been received so far. As described in further detail with respect to FIG. 4, upon termination of the call, the final hash value representing all of the recorded audio and/or video is used in the generation of a digital signature that is included in the generated media file 350.

In certain embodiments, the digital signature for the call recording may also include context information describing the call. A recording of a voice and/or video call by itself may provide sufficient information to serve certain purposes. The hash value generated by hash generator 315 may be used to verify the integrity of a purported copy of the call data. However, in certain scenarios, the context of a call recording may prove necessary to survive an evidentiary challenge to the authenticity of the recording. Consequently, components of the voice communication system, such as the media server 325 of the embodiment of FIG. 3, may collect context information describing each monitored call. In certain embodiments, this call context information may be included as an additional aspect of the digital signature that is included in the generated media file 350.

Controlled-environment facilities may require a resident to enter a PIN (personal identification number) in order to access communication services, including making requests for voice calls and video calls. The PIN information uniquely identifies the resident who is using the resident device. The PIN provided by a resident is one type of context information that may be collected. This collected context information may also include an indication of where a call originated, where a call was terminated, the identity of the calling party, the date of the call, the time and duration of the call, security protocols applicable to the call, other information identifying the person making the call (including biometric information), and other information identifying the called party. In certain embodiments, such information may be collected and aggregated into a record, which may be known as a call detail record (CDR). In addition to call-specific information, a CDR may also include additional information, such as the identity of the facility of the resident and the exact system being used to record and store the call.

Upon termination of a call that is being monitored and recorded, call context data is collected by the CDR generator 325. In certain embodiments, the call context data may be collected by the CDR generator 325 on an ongoing basis during the recording of the call. Various embodiments of the CDR generator 325 may utilize different techniques for obtaining call context information from various sources. The CDR generator 325 aggregates the CDR (e.g., as an XML file) and transmits this call context information to hash generator 330. The hash generator 330 generates a hash value that uniquely identifies the call context information associated with the recorded call. Like the hash value generated based on the received audio and/or video data for the monitored call, the hash value generated based on the call context data can be used to confirm the integrity of a purported copy of the CDR data by using the same hash function as used by hash generator 330 to compute the hash value for the purported copy of the CDR data. By utilizing separate hash values for the communication data and the call context data, the integrity of both can be separately verified. By providing such assurances that the call context information has not been modified, establishing the authenticity of the call recording is further improved.

With the call terminated, the call context hash value generated by hash generator 330 and the voice call hash value generated by hash generator 315 are both forwarded to the digital signature generator 335. In response to the receipt of the two hash values, the digital signature generator 335 proceeds to generate a digital signature for the call recording. In certain embodiments, the digital signature is generated by combining the received call data hash value and the call context hash value to generate a value that uniquely identifies the call, including both the audio and/or video data and the call context. In certain embodiments, the two hash value are combined by the digital signature generator 335 using an XOR function. The resulting combined hash value may then be encrypted with a private key to create a digital signature for the call recording.

In certain embodiments, the digital signature generator 335 sends the completed digital signature to the channel multiplexer 320. The channel multiplexer is configured to combine the received data into the multi-channel media file 350 that is being recorded by the audio file recorder 340. In certain embodiments, the channel multiplexer 320 will organize the various channels of data within the media file 350 using a container format such as OGG (Standards based, IETF-RFC 3533, May 2003). A container format such as OGG may be used to store one or more channels of a voice and/or video call recording and may also store related context information within the same file. A container may be configured to store multiple tracks of data together in a time order.

In certain embodiments, one track of the container used for the signed recording 350 includes the audio and/or video portion of the monitored call. Another track of the container may contain the call context information that is collected by CDR generator 325 during the generation of the signed recording 350 and based on which the call context hash value is generated. Another track of the container may include additional call event information, such as logged information that may be used to further investigate the call. Another track of the container may be used to store the digital signature provided by the digital signature generator 335. The channel multiplexer 320 receives the audio and/or video data, digital signature and hash value information and sequences the received information within the tracks provided by the container format. The stream of data is provided to media file recorder 340 which writes the data to a media file 350, which is then stored to a disk array 345 or other records retention system.

FIG. 4 is a block diagram illustrating certain steps of a process by which a signed call recording is generated according to various embodiments. The process of FIG. 4 may be carried out using the system of FIG. 3, which may be a sub-system of a component such as the single-channel recorder 150 of FIG. 1, or the multi-channel recorder 250*d* of FIG. 2. In certain embodiments, the process of FIG. 4 begins at step 405 with the receipt of an communication data stream of a monitored call that is to be recorded. As described in certain embodiments, multiple channels of audio and/or video data may be incorporated into the stream of the captured communication data. As described, the captured voice and/or video data streams may be buffered as the call data is streamed directly to a media file recording, where the buffering allows segments of the data stream to be processed while the call continues. As segments of received audio and/or video data streams are transferred from the buffer to the media file used for the recording, each data segment may be further processed to generate a hash value that uniquely corresponds to the received call data.

At step 410, the communication data hash value for the voice call is updated. For the receipt of the very first segment of the audio and/or video data corresponding to a monitored call, the communication data hash value consists of the hash value that is calculated for this first segment of the communication data. With the receipt of the next segment of the communication data for the monitored call, this communication data hash value is updated based on this next segment of data. The updating of the communication data hash value results in a hash value that corresponds uniquely to the audio and/or video data present in these first two received segments of communication data. The receipt of each successive segment of the audio and/or video data for the call results in the communication data hash value getting iteratively updated. At the end of the call, the final hash value corresponds to the data for the completed call, such that any modifications to the recording can be identified by attempting to recalculate this same final hash value. In certain embodiments, the hash value calculations may be implemented using a cryptographic hash function such as SHA-256. Other embodiments may use other hash functions for calculating hash values.

The communication data hash value is updated based on each received segment of communication data from a monitored call. At step 415, the updating of the communication data hash value continues as long as the monitored call is not terminated. However, at some point, the monitored call may be terminated at step 415 such that no further call data is being captured or streamed to the media file that is being generated for the recording. In some scenarios, the call may be terminated by one of the parties ending the call. In other scenarios, the call may be terminated by the communication system or by an administrator due to various reasons, such as time limits being reached, insufficient funds in the resident's calling account or the detection of prohibited activity during the call. Upon the call being terminated, notice of this condition is received by components of the signed call recording system.

Once the monitored call has been terminated, at step 430, the final hash value for the communication data is generated and is made available to a digital signature generator. Also in response to the termination of the monitored call, at step 420, call context data is collected. As provided above, this call context data specifies various aspects of the call and may be collected in a variety of manners. At step 425, a call context hash value is generated for the collected call context information. As described, a call context generator provides the ability to verify the integrity of the call context information included in the media file recording, thus improving the ability to establish the authenticity of the call recording.

At step 435, the call context hash value and the audio data hash value are received and used in the generation of an encrypted digital signature. As described, in certain embodiments, the digital signature is generated by combining the audio data hash value and the call context hash value into a new hash value that can be used to verify the integrity of the communication data and context data included in the media file. The combined hash value may then be encrypted to generate the digital signature for the call recording. By encrypting the hash value information with a private key to create the digital signature, the hash value provided with the file can be established as being created by the holder of the private key, thus providing additional chain of custody assurances for the signed call recording. At step 440, the digital signature is saved to the media file used for the recording. In certain embodiments, the digital signature may be saved as one of the tracks of a multi-track media file used to record the voice and/or video call.

In this manner, the hash value for the entire call is generated while streaming the captured communication data to the media file, thus eliminating the need and attendant risk of storing the entire completed call to a file and subsequently calculating a hash value for the completed recording. By avoiding having to save the entire call to memory and waiting for termination of the call to generate a digital signature, the chances the data being tampered with are reduced. Conversely, embodiments provide the ability to generate a hash value for the streaming communication data as this streaming communication data is received and stored to file. Once the call is terminated, the digital signature is created and the media file is finalized such that the call recording is not editable without invalidating the signature. The act of storing the communication data to a file as the data is received simplifies the audit trail used for establishing the integrity and authenticity of the recorded call.

As provided above, signed call recordings may be used in the investigation of prohibited activities. In certain scenarios, the call recordings may be submitted as evidence in a legal proceeding, in which case multiple copies of the call recording may be generated and distributed to the parties to the legal proceeding. In certain scenarios, the call recording—which may include the voice and/or video call data, a digital signature and call context information—may be distributed by copying the recording to physical media, such as a CD, DVD, or flash drive, or may be transferred electronically, such as an electronic mail or message attachment. This allows the communication data to be shared by the recording facility, such as a jail, prison, or other controlled-environment facility, with other users, such as prosecutors, defense counsel, inmates, or friends/family, in a manner that allows the receiving party to confirm that they have a complete, accurate, and unmodified copy of the communication. The audio and/or video of the call and the call context information are not encrypted and thus can be freely played and reviewed. Before a purported copy of a signed call recording may be submitted as evidence in a legal proceeding, the integrity and authenticity of the recording must first be established.

FIG. 5 provides certain steps of a process according to various embodiments for confirming the integrity of a purported copy of the signed voice and/or video call. In certain embodiments, the process begins as step 505 with the receipt of a purported copy of a signed call recording. In certain embodiments, the purported copy of a call recording may be submitted via a web interface that allows a person in possession of the purported copy to submit the purported copy of the recording for verification. The person submitting the purported copy of the file for verification may be an investigator, legal counsel, a court official, one of the call participants or any other person that has received a copy of a signed call recording for any purpose.

At step 510, modifications to the audio file may be identified by comparing the purported copy of the recording against maintained information regarding the call recording. As described above, a signed call recording may be archived as part of evidence preservation procedures implemented by a controlled-environment facility. If a copy of a signed recording is made and distributed, purported copies of the recording may be compared against the archived information in order to identify any discrepancies between the two files, without having to examine the contents of the communication data present in the files. For instance, at step 510, the file name, file size and other file attributes of the purported copy may be compared against the archived information for the call recording. Any such detected changes do not necessarily indicate that tampering has occurred, but may nonetheless provide an indication that close scrutiny of the purported copy is warranted.

At step 515, a hash value is calculated for the audio and/or video data and the call context data present in the purported copy of the media file. This hash value is calculated using the same hash function that was used to calculate the combined communication and call context hash value during the generation of the signed recording of the call. At step 520, the public key is used to decrypt the hash value information that is included in the media file. If the digital signature cannot be successfully decrypted using the public key that corresponds to the private key used during the generation of the signed media file, possible tampering with the purported copy of the recording may be indicated. If the digital signature is successfully decrypted, the authenticity of the hash value provided in the digital signature is assured.

At step 525, the hash value calculated based on the communication data in the purported copy is compared against the hash value provided in the digital signature. If the hash values do not match, modifications to the call data or call context information present in the purported copy are indicated. At this time, the communication data and/or call context information in the purported copy of the file may also be compared against the communication data and/or call context information in the archived recording in order to identify the differences in the purported copy that are causing a different hash value to be calculated. In certain embodiments, at step 530, the hash value decrypted from the digital signature may be compared against the hash value contained in the archived version of the call recording. If these two hash values are not identical, in addition to tampering of the communication data or call context information, tampering with the hash value and forging of the private key used to encrypt the hash value may also be indicated. If all steps of the process of FIG. 5 are completed without any indications of tampering, the system may indicate that the purported copy of the call recording is a true copy of the recoding that was generated at the time the call was conducted. In certain embodiments, an indication of tampering may be provided to a user via the web interface. Other embodiments may utilize other reporting mechanisms for providing tampering information to a user.

Another aspect of generating signed call recordings is the secure storage of the recordings. In addition to ensuring these recordings are not lost, thus resulting in the loss of evidence that could be crucial to criminal or civil matters, the recordings may be subject to various rules and regulations regarding the duration when recordings must be kept and what conditions they may be purged. In certain embodiments, the process of storing, tracking and retrieving the recordings may be implemented using a managed storage system. The managed storage system enables the recordings to be managed by defined policies that include polices for generating and distributing backup copies, writing recordings to offline media for disaster recovery, and ultimately purging recordings when required.

In certain embodiments, the managed storage systems may utilize SAN (Storage Area Network) technology and robotic tape drive systems in order to handle the massive amount of recordings that are created through the processing of calls by residents of a network of controlled-environment facilities that is serviced by the managed storage system. The managed storage system may be configured to automatically enforce retention and management policies without human intervention. By tightly controlling human access to the automated managed storage system, the risk of the recorded evidence being altered or prematurely purged is further reduced. Such embodiments improve the integrity of the process for storing and managing the signed call recordings such that their chain of custody and authenticity can be established without difficulty. The managed storage system may further log events that pertain to a call recording in order to provide an audit trail specifying details regarding the management of and access to the recording.

In certain embodiments, the managed storage system may include investigative capabilities that allow the recorded calls to be searched in various manners. In certain such embodiments, the managed storage system may include a user interface (UI) portal that provides investigators access to the recorded calls and provides search capabilities. In certain embodiments, the UI may allow an investigator to specify search criteria for calls, such as a called party, the phone number of a caller, date/time information, PINs (Personal Identification Numbers) of residents, resident account information, call duration, call locations and/or call attempts. The user interface may allow searches to be conducted across multiple facilities based on the security authorization of the user. In certain embodiments, the user interface may provide the ability to search recorded calls based upon call information, such as the CDR records discussed above, that are included in one of the tracks of a multi-track signed call recording.

Another aspect of the chain of custody for a call recording is the transfer of the signed voice call recording from the managed storage system to an investigator or other party that has been authorized to receive a copy of a call recording. In certain embodiments, the managed storage system may be configured to generate media files suitable for distribution, such as by burning the recorded audio file on a CD (compact disc). Compact disc media remains a common method for storing, distributing and playing recorded audio and/or video files. There are a number of well-known CD formats (e.g., CD-R, CD-RW, CD-ROM). All CD formats are capable of encoding digital data, including audio and video data. In order to provide exact copies of signed call recordings, certain embodiments may include a capability for generating an image of the recording, such as an ISO image file that is suitable for distribution via CD format. The ISO image is an image of a collection of the multi-track audio and/or video files used to encode the call data and the call information, such as CDR data. Including all of this information in the image allows the audit trail for the recordings to be maintained. The chances of tampering are reduced by the managed storage system creating the image directly with no input from external systems. The integrity of the process may be further enhanced by encrypting all sessions where an ISO image is transmitted. The process of creating a complete and fully encapsulated ISO image of a copy of a signed call recording allows the distribution of an exact copy of the recording where the integrity of the copy can be verified in order to ensure it has not been manipulated.

The foregoing has outlined rather broadly the features and technical advantages of the present invention in order that the detailed description of the invention that follows may be better understood. It should be appreciated that the conception and specific embodiment disclosed may be readily utilized as a basis for modifying or designing other structures for carrying out the same purposes of the present invention. It should also be realized that such equivalent constructions do not depart from the invention as set forth in the appended claims. The novel features which are believed to be characteristic of the invention, both as to its organization and method of operation, together with further objects and advantages will be better understood from the following description when considered in connection with the accompanying figures. It is to be expressly understood, however, that each of the figures is provided for the purpose of illustration and description only and is not intended as a definition of the limits of the present invention.

What is claimed is:

1. A method for generating a signed recording of a communication, the method comprising:
   receiving a plurality of data segments that comprise the communication between a resident of a controlled-environment facility and a non-resident of the facility, wherein the data segments comprise received communication data from the resident and from the non-resident, the data segments further comprising:

a data stream including a plurality of channels of media data, wherein a first channel of the plurality of channels of media data is received from a voice call device used by the resident of the controlled-environment facility and wherein a second channel of the plurality of channels of media data is received from a voice call device used by the non-resident of the facility;

computing a segment hash for each of the plurality of data segments;

updating a communication data hash based on each generated segment hash;

saving the plurality of data segments received from the resident and from the non-resident in a first track of a multi-track media file;

generating call context information describing the communication;

computing a call context hash based on the call context information;

generating a digital signature, upon termination of the communication, wherein the digital signature comprises a combination of the communication data hash and the call context information; and saving the digital signature to a second track of the multi-track media file.

2. The method of claim 1, wherein the segment hashes are generated using a cryptographic hash function.

3. The method of claim 1, further comprising: saving the call context information to a third track of the multi-track media file.

4. The method of claim 1, wherein the communication data hash and the call context hash are combined using an XOR logical operation.

5. The method of claim 1, wherein the call context information includes one or more of: the point of origin for the communication, the point of termination of a voice call, an identity of the non-resident, an identity of the resident, biometric information identifying the resident, the date of the communication, the time of the communication, the duration of the communication, and security protocols applicable to the communication.

6. The method of claim 1, wherein the digital signature is further generated by encrypting the combined hash using a private key.

7. A system for generating a signed recording of a communication, the system comprising:

a processor; and a memory coupled to the processor, the memory storing computer-readable instructions that, upon execution by the processor, cause the system to:

receive a plurality of data segments that comprise the communication between a resident of a controlled-environment facility and a non-resident of the facility, wherein the data segments comprise received communication data from the resident and from the non-resident, the data segments further comprising:

a data stream including a plurality of channels of media data, wherein a first channel of the plurality of channels of media data is received from a communication device used by the resident of the controlled-environment facility and wherein a second channel of the plurality of channels of media data is received from a communication device used by the non-resident of the facility;

compute a segment hash for each of the plurality of data segments;

update a communication data hash based on each generated segment hash;

save the plurality of data segments received from the resident and from the non-resident in a first track of a multi-track media file;

generate call context information describing the communication;

compute a call context hash based on the call context information;

generate a digital signature, upon termination of the communication, wherein the digital signature comprises a combination of the communication data hash and the call context information; and save the digital signature to a second track of the multi-track media file.

8. The system of claim 7, wherein the segment hashes are generated using a cryptographic hash function.

9. The system of claim 7, the memory storing additional computer-readable instructions that, upon execution by the processor, cause the system to: save the call context information to a third track of the multi-track media file.

10. The system of claim 7, wherein the communication data hash and the call context hash are combined using an XOR logical operation.

11. The system of claim 7, wherein the call context information includes one or more of: the point of origin for the communication, the point of termination of the communication, an identity of the non-resident, an identity of the resident, biometric information identifying the resident, the date of the communication, the time of the communication, the duration of the communication, and security protocols applicable to the communication.

12. The system of claim 7, wherein the digital signature is further generated by encrypting the combined hash using a private key.

13. A method for verifying a signed recording of a communication, the method comprising:

receiving a multi-track media file storing the signed recording of the communication between a resident of a controlled-environment facility and a non-resident of the facility in a first track of the multi-track media file, the signed recording comprising data segments from a plurality of channels of media data, wherein a first channel of a plurality of channels of media data is from a voice call device used by the resident of the controlled-environment facility and wherein a second channel of the plurality of channels of the media data is received from a voice call device used by the non-resident of the facility;

computing a first hash based on data stored in the first track of the multi-track media file;

decrypting a digital signature stored in a second track of the multi-track media file;

extracting a communication data hash from the decrypted digital signature;

comparing the computed first hash versus the extracted communication data hash; and signaling that the multi-track media file includes a signed recording of the communication, if the computed first hash and the extracted communication data hash are equivalent.

14. The method of claim 13, further comprising:
computing a second hash based on call context information stored in a third track of the multi-track media file;
extracting a call context hash from the decrypted digital signature;
comparing the computed second hash versus the extracted call context hash; and
signaling that the multi-track media file includes a signed copy of the call context information for the communication, if the computed second hash and the extracted call context hash are equivalent.

15. The method of claim 13, wherein the first hash is computed using the same hash function used to generate the extracted communication data hash.

16. The method of claim 13, further comprising:
retrieving an archived communication data hash computed during the generation of the signed recording of the communication;
comparing the computed first hash versus the archived communication data hash; and
signaling that the multi-track media file includes a signed recording of the communication, if the computed first hash and the archived communication data hash are equivalent.

\* \* \* \* \*